United States Patent [19]

Ozaki et al.

[11] Patent Number: 5,596,380
[45] Date of Patent: Jan. 21, 1997

[54] DIGITAL SOUND SIGNAL REPRODUCING APPARATUS FOR PROJECTOR

[75] Inventors: Yoshio Ozaki, Tokyo; Toshiyuki Shirasu; Etsuro Saito, both of Kanagawa, all of Japan

[73] Assignees: Sony Corporation, Tokyo, Japan; Sony Cinema Products Corporation, Culver City, Calif.

[21] Appl. No.: 436,380

[22] PCT Filed: Sep. 22, 1994

[86] PCT No.: PCT/JP94/01568

§ 371 Date: May 22, 1995

§ 102(e) Date: May 22, 1995

[87] PCT Pub. No.: WO95/08789

PCT Pub. Date: Mar. 30, 1995

[30] Foreign Application Priority Data

Sep. 24, 1993 [JP] Japan ................................. 5-238516
Jun. 24, 1994 [JP] Japan ................................. 6-166031

[51] Int. Cl.⁶ ........................... G03B 31/02; G03B 21/50
[52] U.S. Cl. ............................. 352/30; 352/14; 352/27; 352/128
[58] Field of Search ...................... 352/14, 27, 29, 352/30, 128

[56] References Cited

U.S. PATENT DOCUMENTS 4,551,827  11/1985  Custer et al. ........................ 352/1
5,155,510  10/1992  Beard ................................. 352/27
5,327,182   7/1994  Kohut et al. ........................ 352/27
5,386,255   1/1995  Beard et al. ........................ 352/5

FOREIGN PATENT DOCUMENTS 40-14047   5/1965  Japan .
51-20777   5/1976  Japan .
52-51790  11/1977  Japan .
57-46536  10/1982  Japan .

*Primary Examiner*—A. A. Mathews
*Attorney, Agent, or Firm*—William S. Frommer; Alvin Sinderbrand

[57] ABSTRACT

A digital sound signal reading means 20 is provided in association with a sound drum 13 on which an image film 1 delivered from a cinema film supply unit 50 circumferentially travels to carry out reading and reproduction of digital sound signals recorded in a digital sound signal recording portion 5 of the image film 1. An image film traveling adjustment unit 30 is disposed at least at the position of the preceding stage of the image film traveling path. The image film traveling adjustment unit 30 applies traveling load in dependency upon traveling state of the image film 1 to allow the image film 1 to travel up to the digital sound signal reading means 2 in a stable state thus to allow it to carry out reading and reproduction of digital sound signals.

4 Claims, 13 Drawing Sheets

CONFIGURATIONAL VIEW OF DIGITAL SOUND SIGNAL REPRODUCING APPARATUS

CONFIGURATIONAL VIEW OF CONVENTIONAL
DIGITAL SOUND SIGNAL REPRODUCING APPARATUS

CONFIGURATIONAL VIEW OF DIGITAL SOUND SIGNAL REPRODUCING APPARATUS

LONGITUDINAL CROSS SECTIONAL VIEW OF IMAGE FILM TRAVELING ADJUSTMENT UNIT

CONFIGURATIONAL VIEW OF
DIGITAL SOUND PROJECTION SYSTEM

PERSPECTIVE VIEW OF FILM
AUTOMATIC SUPPLY/WINDING UNIT

PERSPECTIVE VIEW OF FEEDING ADJUSTMENT UNIT

PLAN VIEW OF IMAGE FILM

CONFIGURATIONAL VIEW OF OPTICAL READING UNIT

CONFIGURATIONAL VIEW OF SECOND EMBODIMENT DIGITAL SOUND SIGNAL REPRODUCING APPARATUS

CONFIGURATIONAL VIEW OF IMAGE FILM
TRAVELING ADJUSTMENT UNIT

CONFIGURATIONAL VIEW OF THIRD EMBODIMENT
DIGITAL SOUND SIGNAL REPRODUCING APPARATUS

CONFIGURATIONAL VIEW OF FOURTH EMBODIMENT
DIGITAL SOUND SIGNAL REPRODUCING APPARATUS

CONFIGURATIONAL VIEW OF FIFTH EMBODIMENT
DIGITAL SOUND SIGNAL REPRODUCING APPARATUS

EXPLODED PERSPECTIVE VIEW OF
IMAGE FILM TRAVELING LOAD UNIT

LONGITUDINAL CROSS SECTIONAL VIEW OF IMAGE FILM TRAVELING LOAD UNIT

DIGITAL SOUND SIGNAL REPRODUCING APPARATUS FOR PROJECTOR

TECHNICAL FIELD

This invention relates to a digital sound signal reproducing means for a projector provided in association with a digital projecting device constituting a digital sound projection system, and adapted for reproducing a digital sound signal by digital sound signal reading means from a digital sound signal recording section provided in correspondence with image frames of an image film fed out from an image film supply unit.

BACKGROUND ART

In the image film, there are provided continuous image frames and a sound signal recording section along with a large number of perforations bored at a fixed interval along the both side portions in a width direction for the purpose of precisely carrying out frame feed of these image frames. At this sound signal recording section, sound signals are recorded in correspondence with image frames.

In recent cinema systems, there is employed so called a digital sound projection system which has attained enhancement of presence (realism), etc. by stereo sound of more satisfactory sound quality by commonly using not only analog sound but also digital sound. In the image film for such digital sound projection system, a digital sound signal recording section is provided along with an analog sound signal recording section, and a sound signal recording section is constituted by the analog sound signal recording section and the digital sound signal recording section.

Namely, in an image film for digital sound system, respective two left and right perforations are bored in a manner spaced to each other in a feeding direction correspondingly, e.g., every continuous respective image frames. The analog sound signal recording section is provided between one perforations and the image frame, and analog sound signals are recorded therein. Moreover, a pair of left and right digital sound signal recording sections are respectively provided along the area between one perforations and one film side edge and between the other perforations and the other film side edge, and digital sound signals are respectively recorded therein. These digital sound signals are reproduced by a digital sound signal reproducing apparatus 200 which will be described later.

Meanwhile, since an image film for theater of two hours has extensive length which reaches about 18,000 feet or more, the image film was conventionally divided into plural films to respectively wind them on independent film reels. These film reels were alternately mounted on, e.g., two projectors so that screening is carried out. Accordingly, in such a conventional projector system, replacement work and or rewinding work to the projector of film reel, etc. were required. For this reason, many hands were required within a projection room.

In cinema theaters, hands are also short in recent years, and elimination or reduction of labor within the theater is being carried out because reduction of labor cost, etc. Also in the projector system, for the purpose of eliminating replacement work or rewinding work, etc. of a plurality film reels to realize reduction of the number of steps (man-hour) within the projection room, there has been introduced an image film automatic supply/winding unit in which image films are constituted so that they respectively become unitary continuous films every respective titles, and these image films are automatically delivered into a single projector thereafter to rewind them for a second time.

An image film fed out from the image film automatic/winding unit is caused to undergo reading or reproduction of digital sound signals recorded in the digital sound signal recording sections in digital sound signal reproducing apparatus (unit) 200. The digital sound signal reproducing unit 200 is combined with a digital projecting unit (projector), and includes, as shown in FIG. 1, includes a first guide roller 201, a guide sprocket 202, a sound drum 203 and a second guide roller 204 constituting a film traveling path of image film 1 delivered from the image film automatic supply/winding unit. Moreover, the digital sound signal reproducing unit 200 includes first to fourth tension rollers 205 to 208 so that the image film 1 is stably traveled through the traveling path constituent members. An optical reading unit 220 for digital sound which will be described later is provided in association with the sound drum 203.

The first guide roller 201 is disposed at the entrance of the digital sound signal reproducing unit 200 and puts the delivered image film 1 thereon to turn it back (i.e., change its traveling direction) in a horizontal direction. Moreover, the second guide roller 204 is disposed at the exit of the digital sound signal reproducing unit 200 and put the image film 1 thereon to deliver it to the digital projecting unit side. The image film 1 is turned back in a horizontal direction by the first guide roller 201, and is then guided to the sound drum 203 through the second tension roller 206 under the state where the image film 1 is thrust (pushed) on the guide sprocket 202 by the first tension roller 205.

The image film 1 is turned back at the sound drum 203, and is put onto the second guide roller 204 under the state where the image film is thrust (pushed) on the guide sprocket 202 by the third and fourth tension rollers 207 and 208. The second tension roller 206 and the third tension roller 207 are disposed with the film traveling path being put therebetween, and serves to travel the image film 1 in a manner to thrust (push) the image film 1 onto the guide sprocket 202 and the sound drum 203 by elastic (resilient) force of an extension (tension) spring 209 stretched across the respective supporting shafts. It should be noted that tension of the extension spring 209 is very small elastic force, and it is therefore of course that such tension does not constitute hindrance to traveling in the image film traveling path of the image film 1 pulled by the drive sprocket 211 on the digital projecting unit side.

The digital sound signal reproducing unit 200 is not provided with a rotary drive source in the above-described image film traveling path. Accordingly, the image film 1 is caused to undergo, as a drive source, tensile force of the drive sprocket 211 of the digital projecting unit disposed on the succeeding stage side, and is traveled along the image film traveling path within the digital sound signal reproducing unit 200. A flywheel 210 is integrally coaxially provided, as indicated by dotted lines in FIG. 1, on the guide sprocket 202 in order to increase inertia so that it is rotationally operated (actuated) in a stable state.

The guide sprocket 202 has a large number of feed pawls circumferentially provided in a projected manner (hereinafter simply referred to as "projected" depending on circumstances) in a manner spaced in a width direction at the outer circumferential portion thereof, and they are engaged with perforations of the image film 1. Accordingly, the guide sprocket 202 is rotationally operated in counterclockwise direction in FIG. 1 in synchronism with traveling operation of the image film 1 pulled (drawn) by the drive sprocket 211 of the digital projecting unit. Thus, the guide sprocket 202 draws the image film 1 into the digital sound signal reproducing unit 200, and feeds it into the digital projecting unit.

An optical reading unit 220 for digital sound signal is composed of reading light source (not shown), an optical fiber 221, an objective (object lens) section 222, and a CCD line sensor 223. The optical fiber 221 is such that one end portion is positioned in a manner opposite to the reading light source and the other end portion is positioned in a manner opposite to the digital sound recording sections of the image film 1. The objective section 222 and the CCD line sensor 223 are respectively disposed on the optical axis of the optical fiber 221 through the digital sound recording sections of the image film 1.

A digital sound signal recorded in the digital sound signal recording section of the image film 1 is caused to undergo a processing such that rays of light emitted from the light source are guided into the optical fiber 221 and are irradiated onto the digital sound signal recording section, whereby they are respectively focused on the CCD line sensor 223 through the objective section 222 under the state where they are converted into optical light and dark bar code signals.

Meanwhile, in the above-described digital sound projection system, the digital projecting unit and the film automatic supply/winding unit are respectively installed generally in a manner spaced by several meters. For this reason, image film 1 fed out from the film automatic supply/winding unit may undergo a phenomenon such that it hangs down by gravity, or fluctuates by the influence, etc. of slight wind within the projection room. The fluctuating phenomenon of the image film 1 acts as change (fluctuation) of load with respect to the drive sprocket 211 serving as a drive source for pulling (drawing) the image film 1 into the digital projecting unit through the digital sound signal reproducing unit 200, thus producing unevenness of (irregularity) (wow).

As described above, the image film 1 is constituted so that it is held by extremely small force applied when it travels along the image film traveling path having no drive source constructed (provided) in the digital sound signal reproducing unit 200. For this reason, the image film 1 would travels through the image film traveling path under the unstable condition where it is pulsated, as indicated by the portion A of FIG. 1, by rotation of unequal speed of the drive sprocket 211 of the digital projecting section. The flywheel 210 provided at the above-described guide sprocket 202 serves to provide stabilization of traveling state in the image film traveling path of the image film 1 in the case where the image film 1 is delivered in stable state.

While such flywheel 210 effectively acts in the case where image film 1 travels in a relatively stable state, it cannot provide sufficient function for stable traveling of the image film 1 with respect to unevenness of rotation of the drive sprocket 211 resulting from fluctuation phenomenon of the image film 1.

Accordingly, in the above-described digital sound projection system, there were. instances in the optical reading section 220 of the digital sound signal reproducing unit 200 where there occurs so called clock shift of digital sound signal such that reading operation of digital sound signals recorded in the digital sound signal recording section of the image film 1 is not precisely carried out. Such clock shift at the time of reproduction of digital sound signal fails to carry out correct reproduction of digital sound signals from the digital sound signal recording section thus giving rise to serious problem, e.g., break (interruption) of reproduction sound.

One measure for solving such problems is to provide, at the entrance side and the exit side of the digital sound signal reproducing unit 200, mechanisms adapted to be rotationally driven in a synchronous manner to drive the image film 1 thus to prevent traveling in the image film traveling path under the unstable condition where the image film 1 is pulsated. However, such drive mechanisms arise problems such that they are required to be driven precisely in synchronism with the film automatic supply/winding unit and the drive sprocket 211 of the digital projection unit, so the digital sound signal reproducing unit 200 are caused to become complicated and enlarged, and it is required to change the fundamental specification of respective units constituting the digital sound projection system to employ a new configuration.

Moreover, another measure is that tension with respect to image film 1 of respective tension rollers 205 and 208 disposed within the digital sound signal reproducing unit 200 is caused to be exerted to more degree, thus allowing the image film 1 to travel the image film 1 in the image film traveling path under the condition where the image film 1 is always stretched. However, in the case such measure for applying large load onto the image film 1 at all times, a large drive source is required in order to travel and drive the image film 1. Eventually, similarly to the above-described measure, a measure such that any drive source is provided in the digital sound signal reproducing unit 200 is required.

In the case where image film 1 is traveled and driven in the image film traveling path under the condition where large load is applied at all times, there might occur problems such that perforations are deformed or broken, and/or the film surface is damaged so that life time of the image film 1 is lowered to much degree. Accordingly, it was impossible to employ measures as described above by any means.

In view of the above, an object of this invention is to provide a digital sound signal reproducing apparatus for a projector, which is adapted for traveling an image film, which is delivered in an unstable condition, in the image film traveling path in a stable state to precisely reproduce digital sound signals recorded in the digital sound signal recording section by digital sound signal reading means.

DISCLOSURE OF THE INVENTION

A digital sound signal reproducing apparatus according to this invention comprises: a sound drum constituting a portion of an image film traveling path along with traveling guide means, and adapted so that the image film delivered from an image film supply unit circumferentially travels; digital sound signal reading means provided in association with the sound drum, and adapted for reading and reproducing digital sound signals recorded in a digital sound signal recording portion; and an image film traveling unit including traveling load means disposed in a manner at least positioned at the preceding stage of the image film traveling path with respect to the sound drum, and adapted for applying traveling load to the image film delivered to the digital sound signal reading means to stabilizing the traveling state thereof.

Moreover, the digital sound signal reproducing apparatus for projector according to this invention is such that the traveling load means of the image film traveling adjustment unit is constituted by electromagnetic brake means provided in association with traveling guide means constituting the image film traveling path.

Further, the digital sound signal reproducing apparatus for projector according to this invention is such that the traveling load means is provided in association with a traveling guide sprocket disposed in the state where the guide sprocket and the sound drum are in parallel to each other and adapted so that engagement portions (feed pawls) are respectively engaged with perforations at the input side portion of the sound drum of the image film and the output side portion from the sound drum thereof so as to guide traveling of the image film.

Furthermore, the digital sound signal reproducing apparatus for projector according to this invention includes a guide roller which is one of a plurality of guide rollers constituting the image film traveling path, and adapted to be rotatably supported by a supporting lever biased toward one side by elastic (resilient) means; rotational position detecting means for the supporting lever, provided on the support shaft of the supporting lever; and a control section for comparing a displacement position of the supporting lever detected by the rotational position detecting means and a standard (reference) position to send out a control output of a difference between the both positions thus to control the traveling load means.

In addition, the digital sound signal reproducing apparatus for projector according to this invention is such that the traveling load means is constituted by at least one traveling guide roller where the outer circumferential portion on which the image film travels is comprised of a weak adhesive layer.

In accordance with the digital sound signal reproducing apparatus according to this invention constituted as described above, since the image film is delivered to the digital sound signal reading means in a stable state by the image film traveling adjustment unit provided with traveling load means disposed in a manner at least positioned on the supply side of the digital sound signal reading means of the image film traveling path, digital sound signals recorded in the digital sound signal recording section are precisely read and reproduced without producing clock error, etc.

Moreover, in accordance with the digital sound signal reproducing apparatus for projector according to this invention, in the case where the image film travels in the image film traveling path in an unstable state, magnetic brake means constituting the traveling load means becomes operative to apply traveling load to the image film, whereby the image film is delivered to the digital sound reading unit in a stable state. Thus, digital sound signals recorded in the digital sound signal recording section is precisely read and reproduced.

In addition in accordance with the digital sound signal reproducing apparatus for projector according to this invention, the traveling guide roller on which the weak adhesive layer is formed applies very small traveling load onto the image film to deliver it to the digital sound signal reading means in a stable state to allow that reading means to precisely carry out precise reading of digital sound signals, and to eliminate dust, etc. attached (stuck) on the surface of the image film.

BEST MODE FOR CARRYING OUT THE INVENTION

Figure 1:
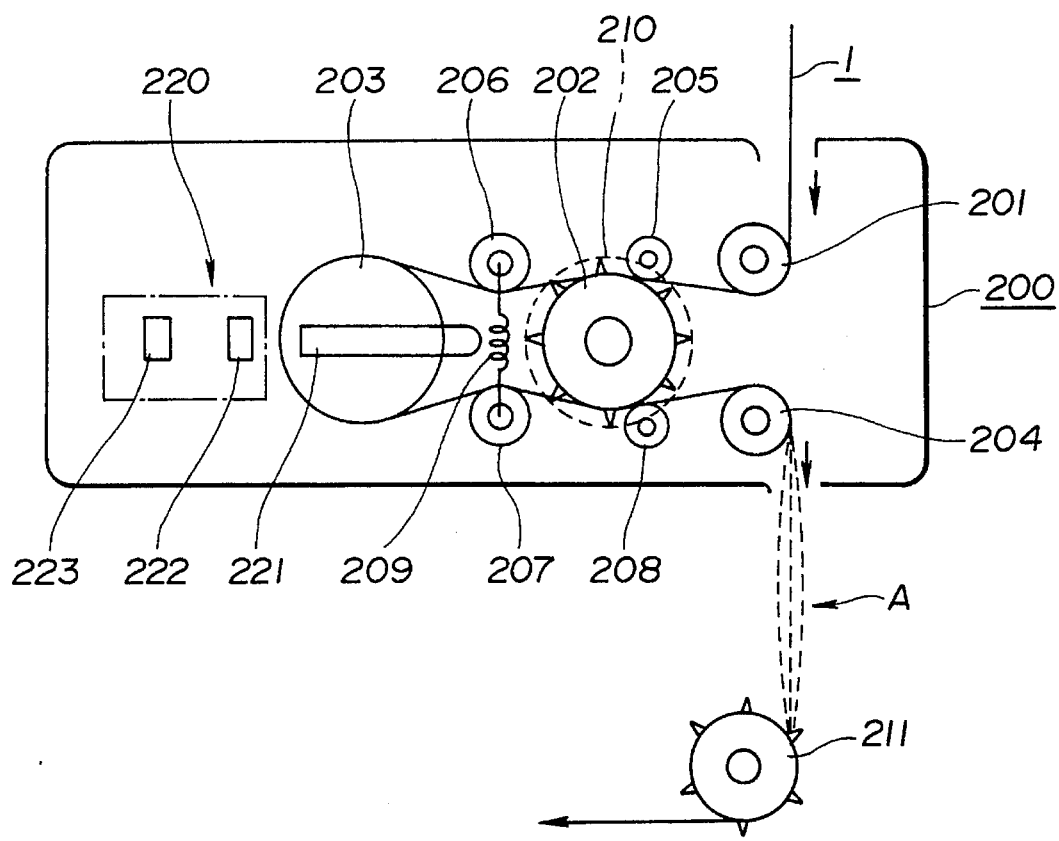
FIG. 1 is a view for explaining outline of the configuration of the entirety of a conventional digital sound signal reproducing apparatus for a projector.

Respective embodiments of this invention will now be described in detail with reference to the attached drawings.

A digital sound signal reproducing apparatus (unit) 10 of a first embodiment according to this invention shown in FIGS. 2 to 10 is an apparatus (unit) provided in association with a digital projecting unit 40, and adapted for reproducing digital sound signals from a digital sound signal recording section 5 provided in correspondence with image frames 2 of an image film 1 delivered from an image film automatic supply/winding unit 50. This unit 10 constitutes a digital sound projection system along with the digital projecting unit 40.

The image film 1 for digital sound projection system is an image film which has attained enhancement of presence, etc. by stereo sound of more satisfactory sound quality by commonly using not only analog sound but also digital sound. Accordingly, in this image film 1, there are provided a pair of left and right digital sound signal recording sections 5A, 5B in which digital sound signals are recorded along with an analog sound signal recording section 4 in which analog sound signals are recorded.

Figure 7:
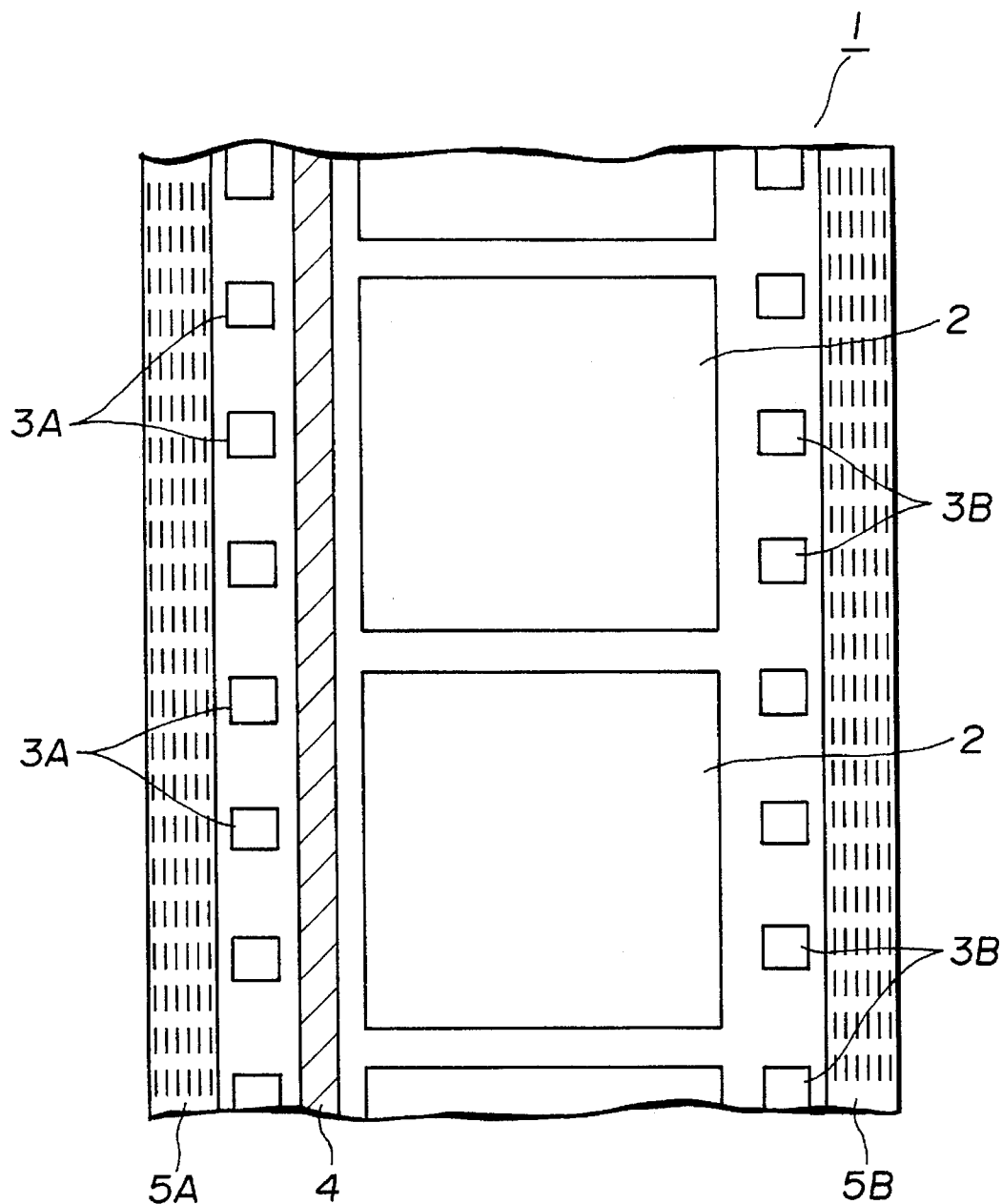
FIG. 7 is a plan view of the essential part of an image film for digital sound projection system.

Namely, in the image film 1, as shown in FIG. 7, e.g., correspondingly every continuous respective image frames, respective two left and right perforations 3A, 3B are continuously bored at a fixed interval in a manner spaced in a feeding direction. The analog sound signal recording section 4 is provided between one perforations 3A and image frames 2, and analog sound signals are recorded therein. Moreover, digital sound signal recording sections 5A, 5B are provided along the areas between perforations 3A and one film side edge and between perforations 3B and the other film side edge, and digital sound signals are respectively stereo-recorded therein.

The analog sound signals recorded in the analog sound signal recording section 4 are constituted by a light screening belt-shaped portion in which the width dimension continuously varies in correspondence with speech (sound) wave, and change of quantity of rays of a transmitted light of an irradiated light is converted into change of electric quantity. Thus, speech (sound) corresponding to image frame is reproduced. Moreover, the digital sound signals recorded in the digital sound signal recording sections 5A, 5B are constituted by bar codes in which patterns are respectively arranged in a direction intersecting with the traveling direction of the image film 1. These digital sound signals are read and reproduced by digital sound signal reproducing apparatus (unit) 10 which will be described later.

Figure 4:
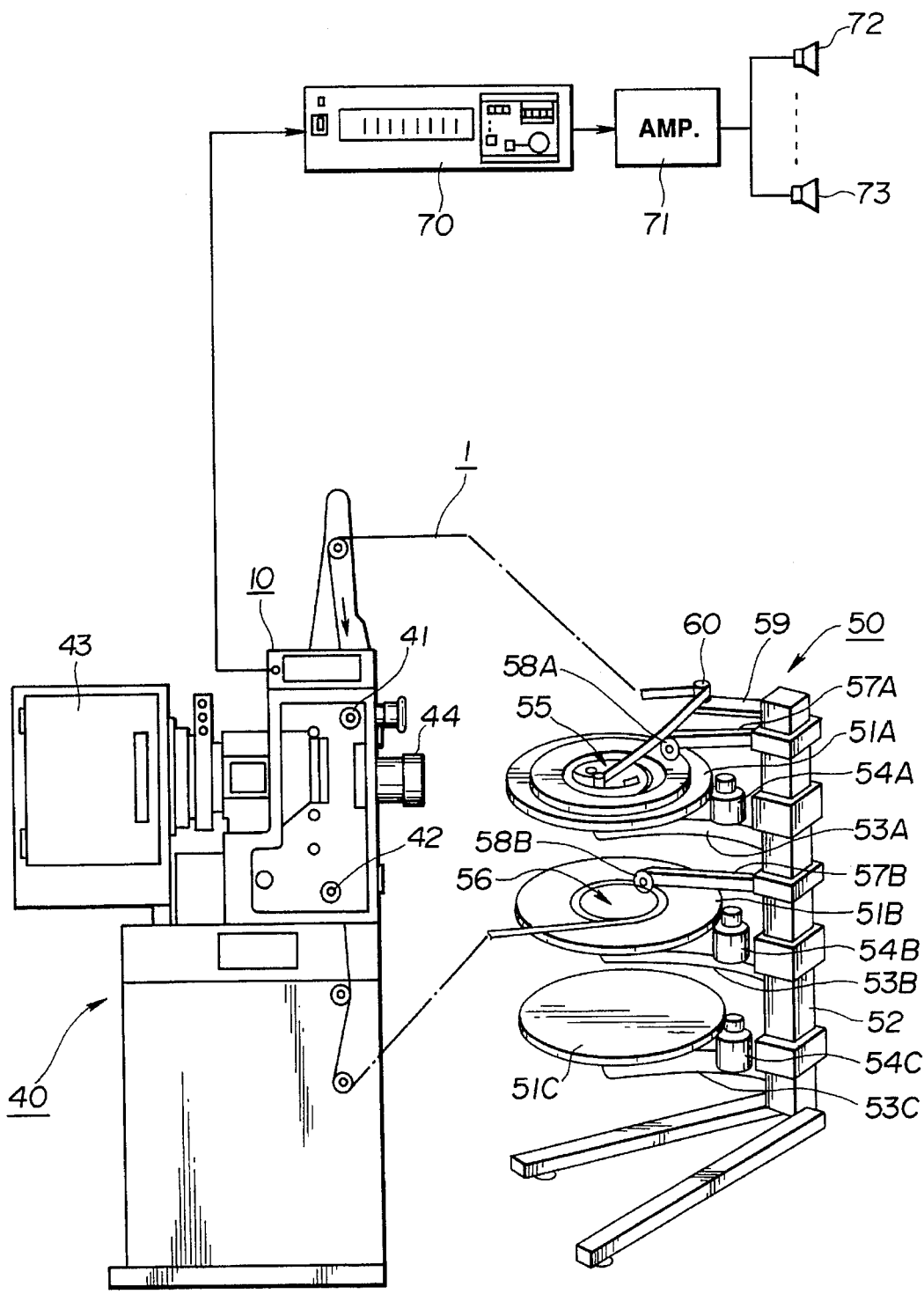
FIG. 4 is a view for explaining outline of the configuration of the entirety of a digital sound projection system in which the digital sound signal reproducing apparatus for projector is used.

FIG. 4 is a view showing outline of the digital sound projection system. The above-described image film 1 is fed out from an image film supply section 51A side of the image film automatic supply/winding unit 50, and is passed through an image film traveling path constructed (formed) in the digital projecting unit 40 through the digital sound signal reproducing unit 10. Then, the image film 1 is returned to the image film automatic supply/winding unit 50 for a second time, and is put on an image film winding section 51B side. The digital projecting unit 40 travels the delivered image film 1 in the image film traveling path with drive sprockets 41, 42 being as a drive source.

In the digital projecting unit 40, a light source section 43 and a projection lens section 44 are disposed in a manner positioned oppositely to the image film traveling path constructed (formed) between the drive sprockets 41, 42. A projection light irradiated from the light source section 43 onto the image film 1 is transmitted through the image film 1. Then, that light is caused to undergo adjustment of image at the projection lens section 44, and is projected onto screen (not shown). The image, film 1 fed out from the image film automatic supply/winding unit 50 is traveled along a predetermined image film traveling path constructed (formed) between the light source section 43 and the projection lens section 44, between the drive sprockets 41, 42 through the digital sound signal reproducing unit 10, and is then wound by the winding section side of the image film automatic supply/winding unit 50 for a second time.

Figure 5:
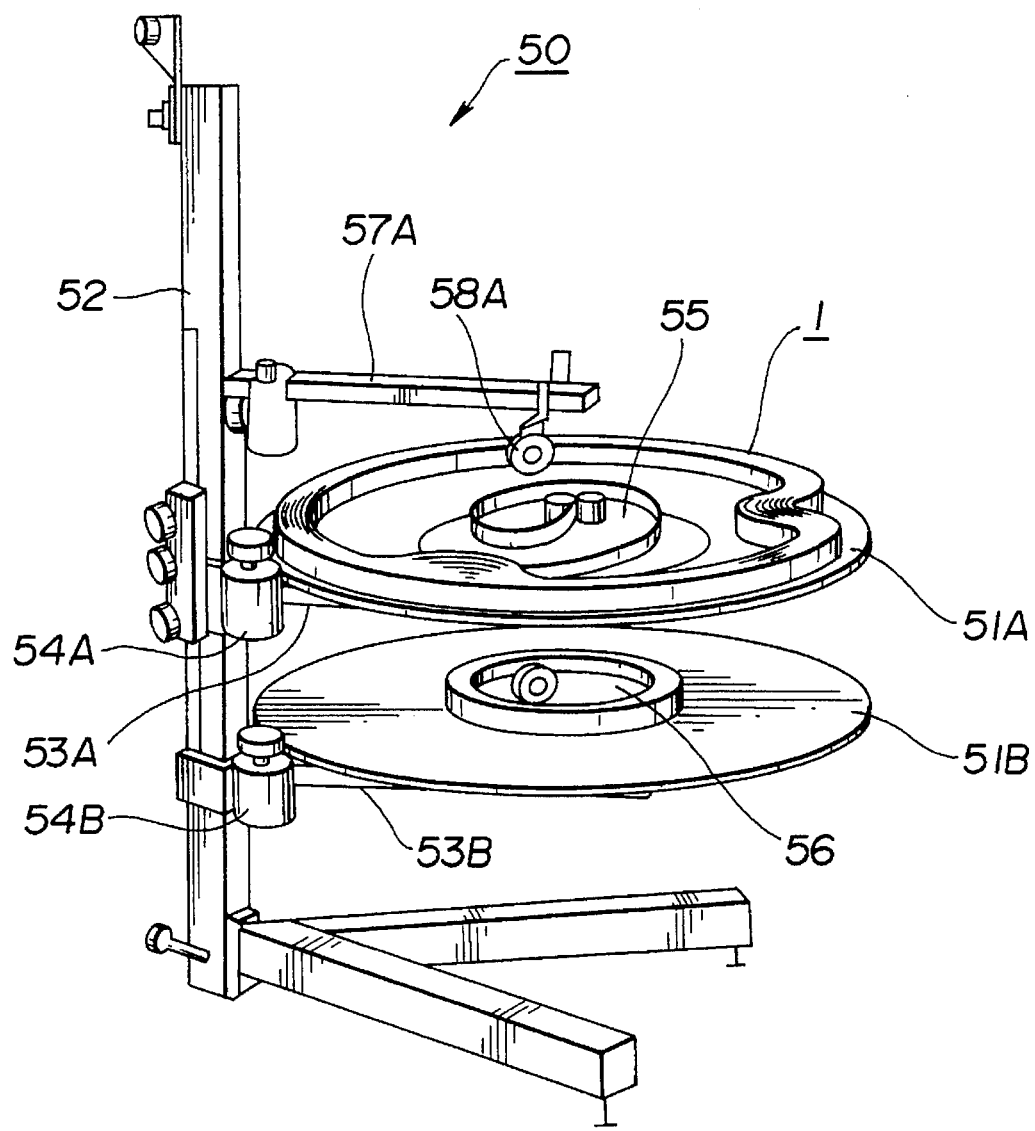
FIG. 5 is a perspective view of an image film automatic supply/winding unit constituting the digital sound projection system.

Since the image film automatic supply/winding apparatus 50 winds image film 1 connected so that its extensive length is provided with films of respective titles as described above, it is provided with a plurality of turn tables (platters) 51A to 51C having diameter of about 1.5 meters as shown in FIG. 5. These turn tables 51A and 51C are such that their center portions are respectively rotatably supported at cantilever arms 53A to 53C vertically movably supported at a stand 52. Moreover, these turn tables 51A to 51C are such that output portions of servo motors 54A to 54C disposed at the cantilever arms 53A to 53C are in contact with the outer circumferential portion, and are rotationally driven in a feeding direction or in a winding direction of the image film 1.

In the image film automatic supply/winding unit 50 shown in FIG. 5, the first turn table 51A constitutes a supply portion of the image film 1, and the second turn table 51B constitutes a winding portion of the image film 1. Additionally, the third turn table 51C is a turn table for reservation. At the turn table 51A of the supply side, a feeding adjustment section 55 for controlling rotation of a servo motor 54A is disposed at the central position thereof. The image film 1 wound on the supply side turn table 51A is successively fed out from the supply side turn table 51A of which rotation is controlled by the feeding adjustment section 55, and is delivered to the digital projecting unit 40. Moreover, at the winding side turn table 51B, a winding adjustment section 58 for controlling rotation of the servo motor 54B is disposed at the central position thereof. The image film 1 is successively wound from the inner circumferential side to the outer circumferential side onto the winding side turn table 51B of which rotation is controlled by the winding adjustment unit 56.

It is to be noted that while illustrated only at the supply side turn table 51A in FIG. 5, guide arms 57A, 57B are vertically movably cantilever-supported at the stand 52. At these guide rollers 57A, 5B, holding rollers 58A, 58B for pushing (thrusting) the image film 1 onto the supply side turn table 51A side to thereby hold winding state are rotatably attached. Moreover, at the stand 52, there is vertically movably supported a guide arm 59 at which a guide roller 60 for guiding the image film 1 fed out from the supply side turn table 51A is rotatably attached.

Figure 6:
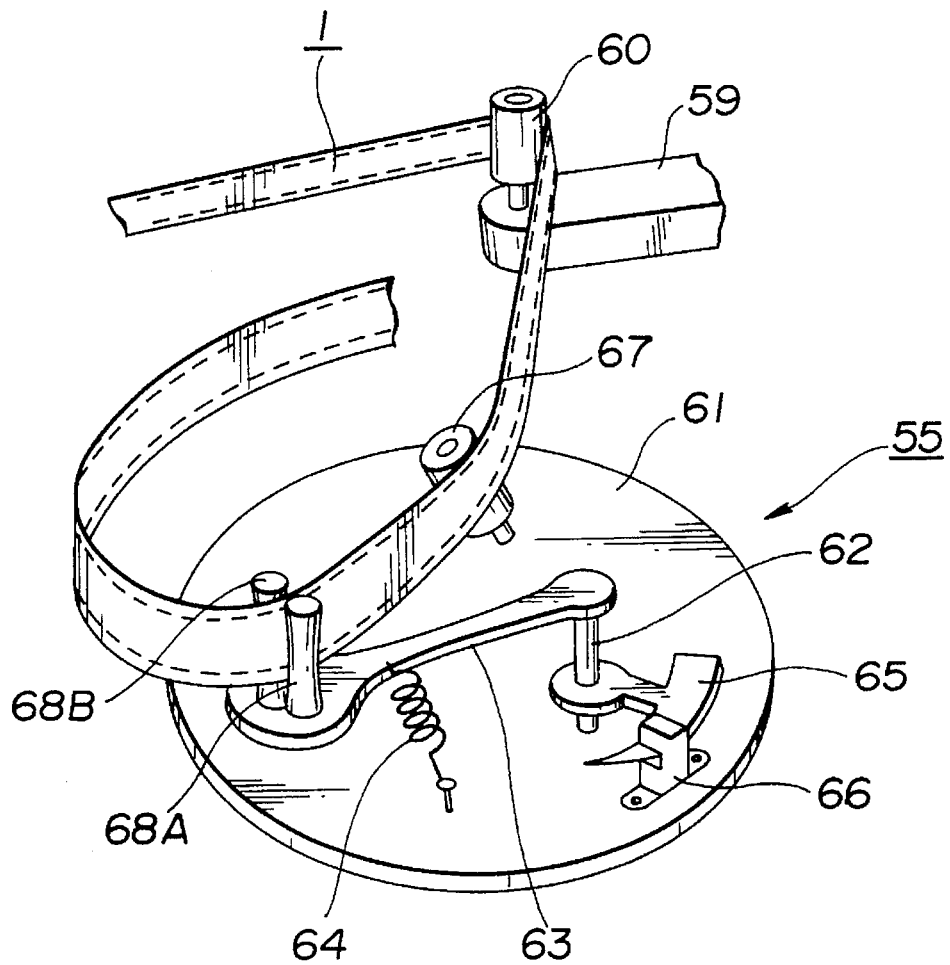
FIG. 6 is a perspective view of a feeding adjustment unit provided in the image film automatic supply/winding unit.

The feeding adjustment section 55 constitutes an internal core portion of the image film 1 wound on the supply side turn table 51A as shown in FIG. 5. The feeding adjustment unit 55 is composed, as shown in FIG. 6, of members such as a base plate 61, a film guide arm member 63 supported at one end portion thereof by a support shaft 62 vertically provided on the base plate 61, a extension (tension) spring 64 for biasing the film guide arm member 63 toward. one side, a substantially circular arc shaped shutter member 65 rotating in a body with the film guide arm member 63 with the supporting shaft 62 being as a fulcrum, a sensor 66 disposed in a manner facing to the rotation area of the shutter member 65, and a guide roller 67, etc. At the film guide arm member 63, a pair of guide rollers 68A, 68B positioned at the free end and adapted for lightly holding the image film 1 therebetween are rotatably attached.

The image film 1 wound on the supply side turn table 51A is fed out to the digital projecting unit 40 under the state where it is put between the pair of guide rollers 68A, 68B provided at the film guide arm member 63, and is stretched over the guide roller 67 or the guide roller 60 provided at the guide arm When the supply side turn table 51A is rotated in a film supply direction by the operation of the servo motor 54A, the image film 1 is loosened from the inner circumferential side thereof, and is successively fed out in the state where it is pulled (drawn) by the first drive sprocket 41 of the digital projecting unit 40. At this time, a suitable brake force is applied to the image film 1 by elastic (resilient) force of extension (tension) spring 64 exerted on the film guide arm member 63.

Moreover, the film guide arm member 63 is fluctuated, with the supporting shaft 62 being as fulcrum, by fluctuation (change) of drawing force of the image film 1. An angular change of the shutter member 65 followed by fluctuation of the film guide arm member 63 is detected by the sensor 66. The angular change thus detected is applied to the servo motor 54A as an output change quantity of an electric signal. Accordingly, a rotational speed of the servo motor 54A is adjusted by a control output of the sensor 66 so that adjustment between drawing force of the image film 1 and elastic (resilient) force of the extension (tension) spring 64, thus making it possible to feed (draw) out the image film 1 even only by extremely small force. Then, the image film 1 is fed into the second drive sprocket 42 of the digital projecting unit 40 and is wound onto the winding side turn table 51B.

Since the winding adjustment section 56 disposed at the winding side turn table 51B are the same in the configuration and the operation as the above-described feeding adjustment section 55, the detailed explanation thereof is omitted.

With respect to the image film 1 fed out from the image film automatic supply/winding unit 50, in the digital sound signal reproducing unit 10, reading and reproduction of digital sound signals recorded in digital sound signal recording sections 54A, 54B are carried out. Digital sound signal output which have been caused to undergo reading and reproduction by the digital sound signal reproducing unit 10 are inputted to a processor TO, at which signal processing is implemented thereto. Outputs of the processor 70 are inputted to respective speakers 72 of the speaker system through an amplifier 71, and digital sound signals on the image film 1 are reproduced. Thus, user can enjoy digital sound.

The digital sound signal reproducing unit 10 is combined with the upper portion of the digital projecting unit as described above, and includes, as shown in FIG. 2, a first guide roller 11, a guide sprocket 12, a sound drum 13 and a second guide roller which constitute an image film traveling path of the image film 1 delivered from the image film automatic supply/winding unit 50. Moreover, the digital sound signal reproducing unit 10 includes first to fourth tension rollers to 18 so that the image film 1 is stably traveled through members constituting the image film traveling path. The optical reading unit 20 for digital sound signal which will be described later is provided in association with the sound drum 13.

The first guide roller 11 is disposed on the image film supply port 10A side of the digital sound signal reproducing unit 10, and serves to put delivered image film 1 thereonto to turn it back (i.e., change traveling direction) in a horizontal direction. Moreover, the second guide roller 14 is disposed on the image film sending port 10B side of the digital sound signal reproducing unit 10, and serves to put image film 1 thereonto to deliver it to the digital projecting unit 40 side. The image film 1 is turned back in a horizontal direction by the first guide roller 11, and is then guided to the sound drum 13 through the second tension roller 18 under the state where it is thrust (pushed) onto the guide sprocket 12 by the first tension roller 15.

The image film 1 is turned back at the sound drum 13, and is put onto the second guide roller 14 under the state where it is thrust (pushed) onto the guide sprocket 12 by the third and fourth tension rollers 17 and 18. The second tension roller 16 and the second tension roller 17 are disposed with the image film traveling path being put therebetween, and travels the image film 1 under the state where it thrusts the image film 1 onto the guide sprocket 12 and the sound drum 13 by elastic (resilient) force of the extension (tension) springs 19 stretched on the respective supporting shafts. It is to be noted that tension of the extension (tension) spring 19 is very small elastic force, and it is therefore of course that such tension does not constitute obstacle to traveling in the image film traveling path of the image film 1 pulled (drawn) by the first and second drive sprockets 41, 42 of the digital projecting unit 40.

The digital sound signal reproducing unit 10 has no rotation drive source in the above-described image film traveling path. Accordingly, the image film 1 travels in the image film traveling path within the digital sound signal reproducing unit 10 under the state tensile force of the drive sprockets 41, 42 of the digital projecting unit 40 disposed on the succeeding stage is exerted as a power source.

Figure 2:
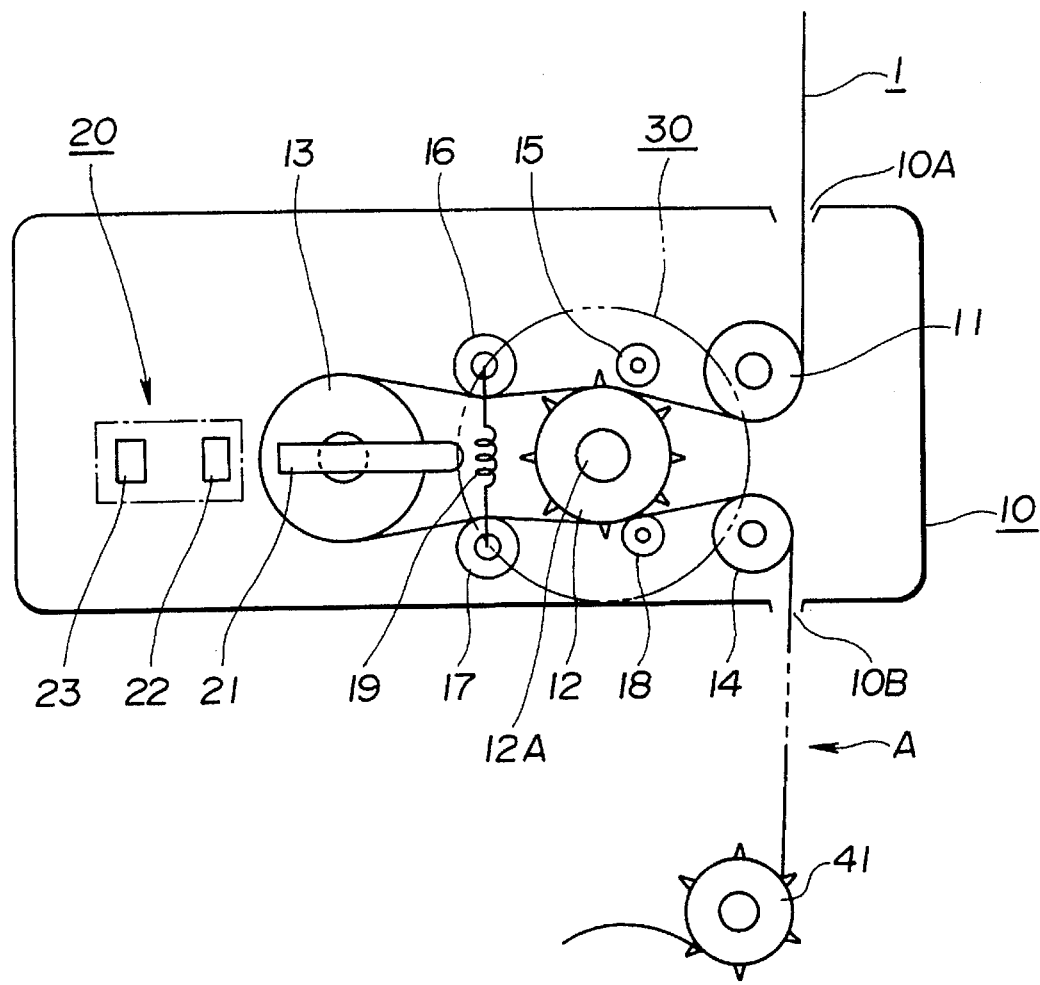
FIG. 2 is a view for explaining outline of the configuration of the entirety of a first embodiment of a digital sound signal reproducing apparatus for a projector according to this invention.

At the guide sprocket 12, as indicated by dotted lines in FIG. 2, in order to travel the image film 1 in the image film traveling path in a stable state, image film traveling adjustment unit 30 which will be described later is disposed. The guide sprocket 12 has a large number of feed pawls circumferentially projected in a manner spaced in a width direction at the outer circumferential portion thereof, and these pawls are engaged with perforations 3A, 3B of the image film 1. Accordingly, the guide sprocket 12 is rotationally operated (actuated) in counterclockwise direction in FIG. 2 in synchronism with traveling operation of the image film 1 pulled (drawn) by the first drive sprocket 41 of the digital projecting unit 40. Thus, the guide sprocket 12 pulls (draws) the image film 1 from the image film supply port 10A into the digital sound signal reproducing unit 10, and feeds it from the image film sending port 10B to the digital projecting unit 40.

Figure 8:
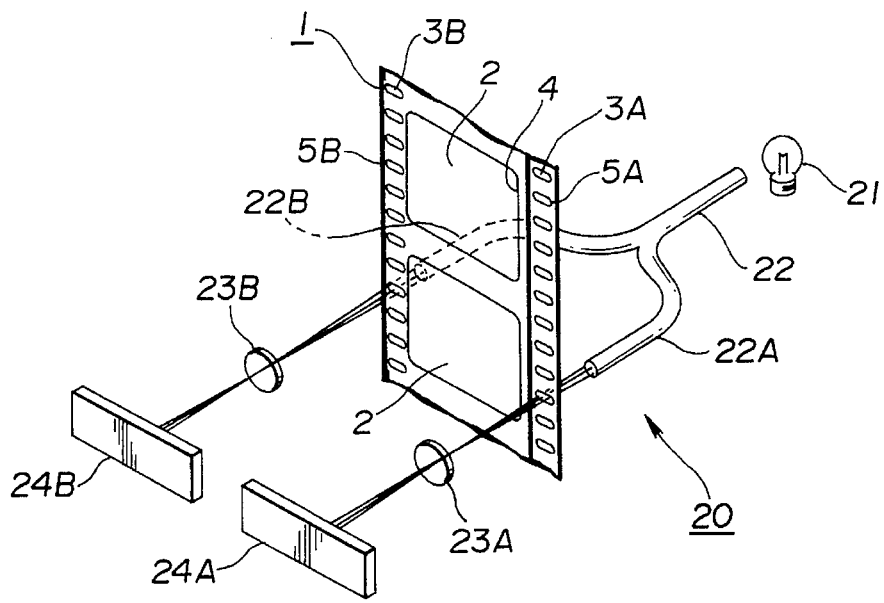
FIG. 8 is a view for explaining the configuration of an optical reading unit for reading and reproducing digital signals recorded in digital sound signal recording portions of the image film.

The optical reading unit 20 for digital sound signal is composed of, as shown in FIG. 8, a reading light source 21, an optical fiber 22, an objective (object lens) sections 23A, 23B, and CCD line sensors 24A, 24B. The optical fiber 22 is of a structure in which one end portion is positioned in a manner opposite to the reading light source 21 and the other end is branched into two portions so that their branched portions are respectively positioned in a manner opposite to digital sound recording sections 5A, 5B of the image film 1.

The objective sections 23A, 23B and the CCD line sensors 24A, 24B are respectively disposed on the optical axes of the branched front end portions 22A, 22B of the optical fiber 22 through the digital sound recording sections 5A, 5B of the image film 1. As described above, digital sound signals are arranged in a bar code form on lines in a direction intersecting with the traveling direction in the digital sound signal recording section 5A, 5B of the image film 1.

Accordingly, with respect to digital sound signals recorded in the digital sound signal recording sections 5A, 5B, when rays of light emitted from the light source 21 are introduced into the optical fiber 22, and are irradiated onto digital sound signal recording sections 5A, 5B from the branched front end portions 22A, 22B, the above-mentioned digital sound signals are converted into optical dark and bright bar code signals, and images corresponding thereto are respectively formed on the CCD line sensors 24A, 24B through the object lenses 23A, 23B.

The CCD line sensors 24A, 24B converts, as described above, an optical code signal corresponding to a digital sound signal into an electric code signal to output it to the processor 70. The digital sound signal recorded in the digital sound signal recording areas 5A, 5B of the image film 1 which has been caused to undergo reading/reproduction by the digital sound signal reproducing unit 10 and has been inputted to the processor 70 is outputted to respective speakers 72, 73 of the speaker system through the amplifier 71. Thus, user can enjoy digital sound.

As described. above, in the digital sound projection system, the digital projecting unit 40 and the image film automatic supply/winding unit 50 are respectively generally installed (provided) in a manner spaced by about several meters. For this reason, image film 1 fed out from the image film automatic supply/rewinding unit 50 is caused to undergo a phenomenon such that it hangs down by gravity or fluctuates by the influence of slight wind, etc. within a projection room. Although the feeding adjustment section 55 is provided in the image film automatic supply/winding unit 50, it is impossible to eliminate fluctuating phenomenon of the image film 1 by the feeding adjustment section 55. The fluctuating phenomenon of the image film 1 is exerted as change of load with respect to drive sprockets 41, 42 serving as a drive source for drawing the image film 1 into the digital projecting unit 40 through the digital sound signal reproducing unit 10. Accordingly, unevenness of rotation (wow) takes place in these drive sprockets 41, 42.

Such unevenness of rotation of these drive sprockets 41, 42 is adjusted by the image film traveling adjustment unit 30 disposed at the digital sound signal reproducing section 10. Accordingly, the image film traveling adjustment section 30 can travel the image film 1 in the image film traveling path in an extremely stable state to carry out, in a stable state, reading and reproduction of digital sound signals recorded in the digital sound signal recording sections 5A, 5B.

Figure 3:
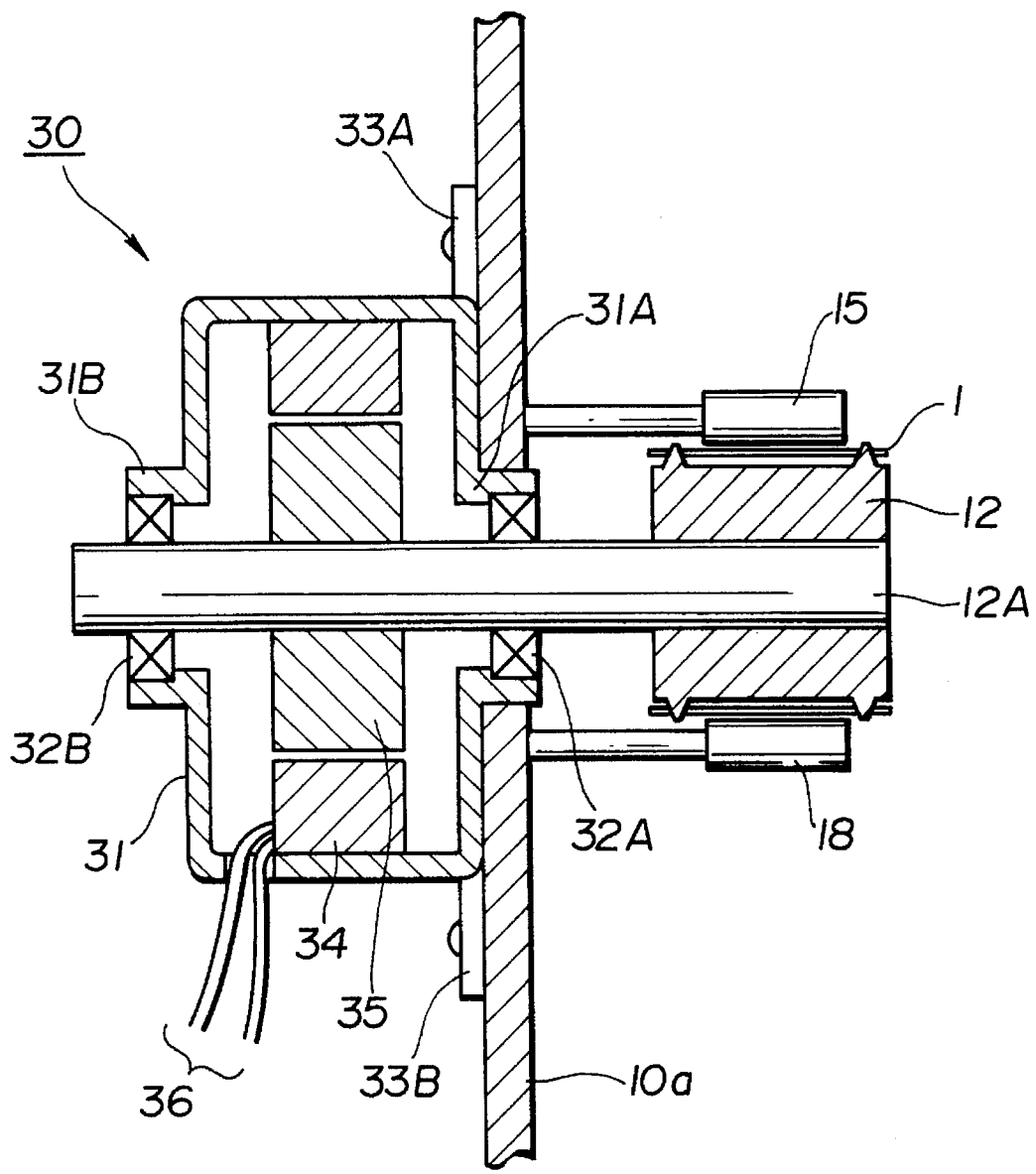
FIG. 3 is a longitudinal cross sectional view of an image film traveling adjustment unit provided in the digital sound signal reproducing apparatus for projector.

The image film traveling adjustment section (labeled unit in the figure) 30 is assembled at a supporting shaft 12A of the guide sprocket 12 as shown in FIG. 3. Namely, the guide sprocket supporting shaft 12A is penetrated through a side plate 10a of the digital sound signal reproducing unit 10, and an electromagnetic brake section constituting the image film traveling adjustment section 30 is disposed at the penetration end portion. This image film traveling adjustment section 30 is an electromagnetic brake section of which fundamental configuration is substantially the same as that of the a.c. induction motor, and includes a closed tubular case 31, a stator 34 and a rotor 35, wherein attachment flange pieces 33A, 33B formed integrally with the outer circumferential portion of the case 31 is screw-connected to side plate 10a of the digital sound signal reproducing unit 10.

At the case 31, bearing tubular portions 31A, 31B are integrally formed at the both peripheral surface portions thereof in such a manner that their axes are in correspondence with each other, and a guide sprocket supporting shaft 12A is rotatably supported by bearing members 32A, 32B fitted into these bearing tubular portions 31A, 313. The stator 34 is formed to be ring-shaped, and is connected and fixed to the inner circumferential surface of the case 31. The rotor 35 is disc-shaped, and the outer circumferential surface thereof is fixed to the guide sprocket supporting shaft 12A in a manner to oppose to the inner circumferential surface of the stator 35.

In the image film traveling adjustment section 30 thus constituted, in the case where a.c. power is applied through a power supply code 36 connected to the stator 34 as in the case of a.c. induction motor, the rotor 35 is rotationally driven. On the contrary, in the embodiment image film traveling adjustment section 30, d.c. power is applied through the power supply code 36. Thus, across the stator 34 and the rotor 35, eddy current takes place, so a brake force is applied to the rotor 35.

Application of the d.c. power of the image film traveling adjustment section 30 is carried out under the state where unevenness of rotation (wow) takes place at drive sprockets 41, 42 by fluctuating phenomenon of the image film 1. The brake force produced across the stator 34 and the rotor 35 is exerted as rotation load of the guide sprocket supporting shaft 12A, i.e., the guide sprocket 12. Accordingly, the image film traveling between the guide sprocket 12 and the drive sprocket 41 is placed in the state where it is pulled by the guide sprocket 12 to which rotation load is applied. Thus, fluctuating phenomenon is eliminated. For this reason, the drive sprocket 41 rotates under a fixed condition, thus traveling the image film 1 in a stable state in the image film traveling path by the drive sprocket 41 and the guide sprocket 12.

As described above, as the result of the fact that feed pawls are engaged with perforations 3A, 3B of the image film 1, the guide sprocket 12 guides going and returning traveling of the image film 1 of the sound drum 13. Accordingly, by the brake force of the image film traveling adjustment section 30, traveling road exerted on the image film 1 from the guide sprocket 12 is limited to the range of the image film 1 existing between the guide sprocket 12 and the sound drum 13, and is not therefore applied over the entirety of the image film traveling path. Since the image film 1 is prevented from traveling under the state where traveling load is applied over the entirety of the image film traveling path, damage of image frame is prevented.

As stated above, the digital sound signal reproducing unit (apparatus) 10 provided with the image film traveling adjustment section (unit) 30 is operative so that even in the case where there occurs fluctuating phenomenon, etc. of the image film 1 hanging down between the unit 30 and the image film automatic supply/winding unit 50, the apparatus 10 delivers the image film 1, in a stable state, to the sound drum 13 positioned at the succeeding stage of the image film traveling path. Thus, the optical reading unit 20 provided in association with the sound drum 13 carries out, in a stable state, reading and reproduction of digital sound signals recorded in the digital sound signal recording section 5A, 5B.

While this invention is limited to the above-described digital sound signal reproducing apparatus 10, this invention can be developed as in the case of respective embodiments described below. Namely, FIGS. 9 and 10 shows a second embodiment digital sound signal reproducing apparatus (unit) 80, characterized in that an adjustment mechanism is provided in association therewith, thereby making it possible to adjust a brake force serving as rotation load of the guide sprocket 12 caused to be produced in the image film traveling adjustment unit 30 so that it is optimum.

The image film 1 is delivered from an image film supply port 81A into the digital sound signal reproducing unit 80. After reading and reproduction of a digital sound signal is carried out by optical reading unit 20 provided in association with sound drum 13, the image film is turned back at a second guide roller 81 via third tension roller 17, guide sprocket 12 and fourth tension roller 18, and is delivered to digital projecting unit 40 from an image film sending port 80B. An adjustment mechanism for adjusting a brake force of the above-described image film traveling adjustment unit 30 is provided in association with the second guide roller 81, and is composed of the second guide roller 81, a fluctuation lever 82, an extension (tension) spring 83, and a potentiometer 85.

The second guide roller 81 is rotatably supported at a supporting shaft 81A supported on the free end of the fluctuation lever 82 one end side of which is cantilever-supported by a supporting shaft 84. The supporting shaft 84 of the fluctuation lever 82 is rotatably supported by bearing portion (not shown) provided at the side plate of the digital sound signal reproducing unit 80, and the potentiometer 85 is combined therewith. The potentiometer 85 is a device for detecting position in a rotational direction. The extension (tension) spring 83 is such that one end portion thereof is fixed to the side plate of the digital sound signal reproducing unit 80, and the other end portion is put on (connected to) the fluctuation lever 82, thereby biasing the fluctuation lever 82 in clockwise direction in FIG. 9.

Figure 9:
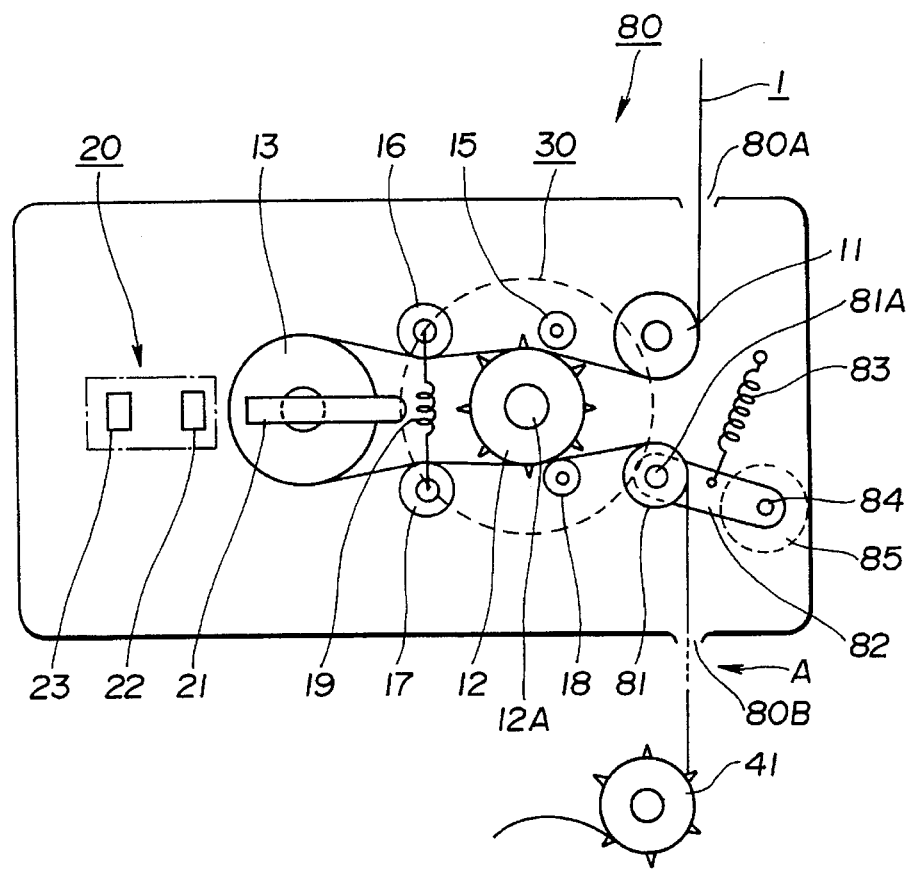
FIG. 9 is a view for explaining outline of the configuration of the entirety of a second embodiment of a digital sound signal reproducing apparatus for a projector according to this invention.
Figure 10:
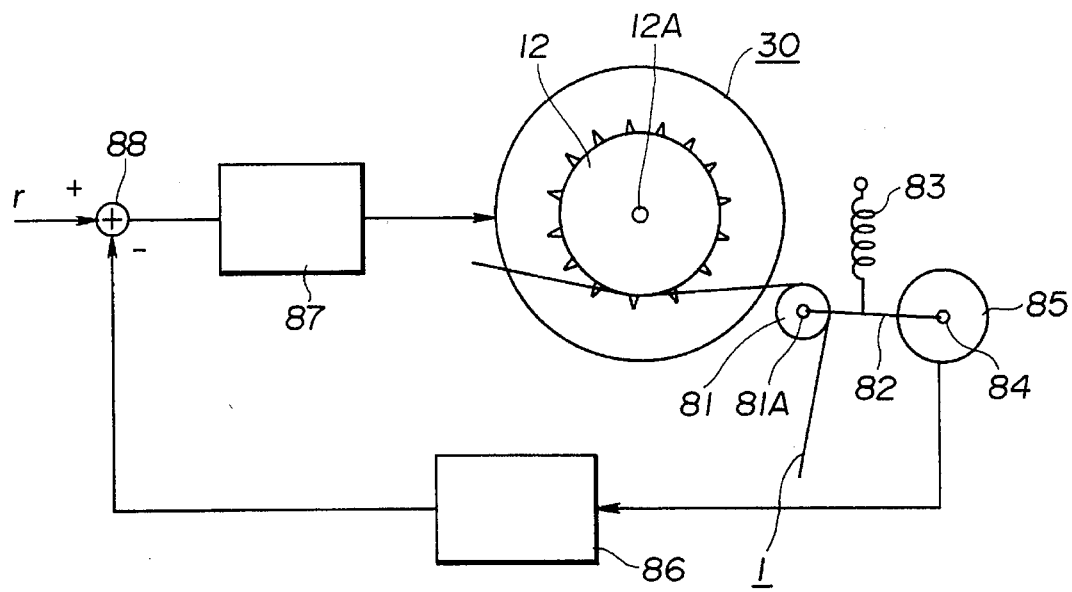
FIG. 10 is a block diagram for explaining the configuration of an image film traveling adjustment unit provided in the digital sound signal reproducing apparatus for projector.
Figure 11:
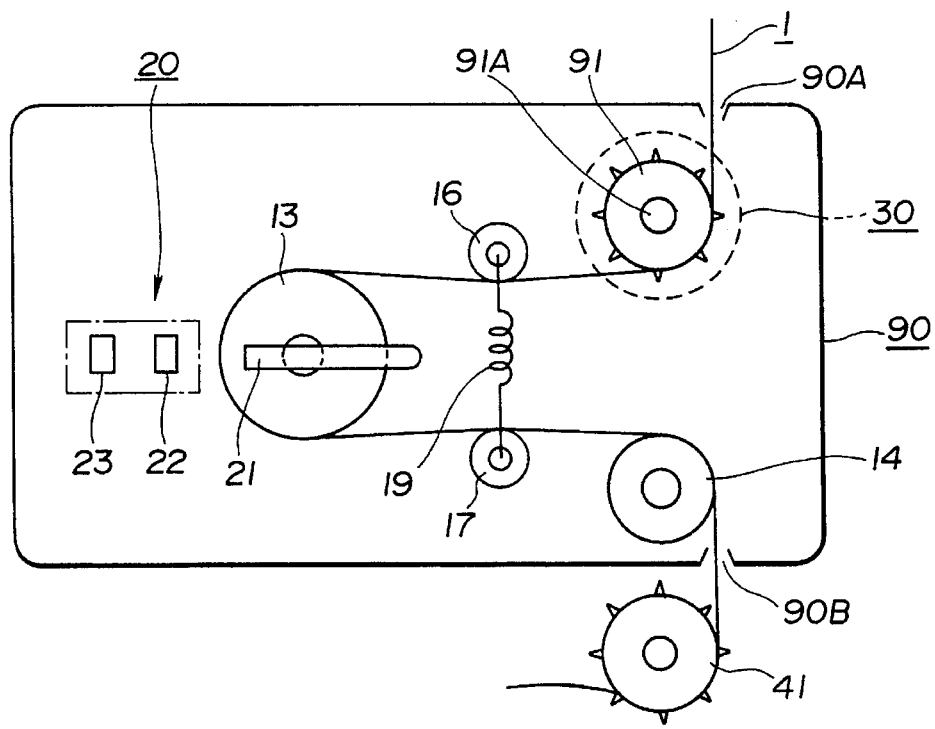
FIG. 11 is a view for explaining outline of the configuration of the entirety of a third embodiment of a digital sound signal reproducing apparatus for projector according to this invention.

It is to be noted that while this extension (tension) spring 83 biases the second guide roller 81 supported by the fluctuation lever 82 in clockwise direction in FIG. 9, its tensile force is extremely small and does not constitutes traveling load with respect to the image film 1 traveling in the image film traveling path. Fluctuation phenomenon of the image film 1 is such that the drive sprocket 41 is caused to produce unevenness of rotation to draw, in an unstable state, through the image film sending port 80B from the digital sound signal reproducing unit 80, whereby such a fluctuation is transmitted to the second guide roller 81 to fluctuate the fluctuation lever 82. This fluctuation operation of the fluctuation lever 82 is detected by potentiometer 85. Thus, an electric output is send out.

An output of the potentiometer 85 of the above-described adjustment mechanism is inputted to a feedback control section shown in FIG. 10 to control a d.c. power applied to the image film traveling adjustment unit 30. The feedback control section is composed of an amplifier 86 to which a detection output of the potentiometer 85 is inputted, a comparator 88 for comparing an output value from the amplifier circuit 86 and a target value r, and a driver circuit 87 of the image film traveling adjustment unit 30.

An output of the potentiometer 85 is amplified by the amplifier 86 and is compared with target value r at the comparator 88. The comparator 88 sends out an output corresponding to a difference between the target value r and a detection output to the driver circuit 87. The driver circuit 87 applies a d.c. power of a predetermined voltage to the image film traveling adjustment unit 30 to thereby produce a desired brake force across the stator 34 and the rotor 35 of the image film traveling adjustment unit 30 to control rotational operation of the guide sprocket 12.

The image film traveling adjustment unit 30 is operative so that in the case where, e.g., unevenness of the drive sprocket 41 is great and an output from the potentiometer 85 is outputted on the basis of great fluctuation of the fluctuation lever large rotation load is exerted on the guide sprocket 12. On the other hand, the image film traveling adjustment unit 30 is operative so that in the case where, e.g., unevenness of rotation of the drive sprocket 41 is small and an output from the potentiometer 85 is outputted on the basis of a small fluctuation of the fluctuation lever 82, it applies a smaller rotation load to the guide sprocket 12. Accordingly, the image film 1 is traveled in the image film traveling path in an optimum and stable state.

A digital sound signal reproducing apparatus (unit) 90 is such that image film traveling adjustment unit 30 is provided in association with a guide sprocket 91 disposed at an image film supply port 90A. The image film 1 delivered from a supply section 51A of image film automatic supply/winding unit 50 is delivered into the digital sound signal reproducing unit 90 from the image film supply port 90A. The image film traveling adjustment unit 30 provided in association with the guide sprocket 91 disposed at the image film supply port 90A allows the image film 1 delivered in fluctuated state into the digital sound signal reproducing unit 90 so that the image film 1 is in stable state to deliver it from the image film sending port 90B to the digital projecting unit 40.

In the third embodiment digital sound signal reproducing unit 90, the guide sprocket 91 is disposed in place of the first guide roller at the image film supply port 90A. A supporting shaft 91A of the guide sprocket 91 is penetrated through the unit side plate and is elongated so that rotor 35 of the image film traveling adjustment unit 30 is fixed. The image film 1 delivered to the digital sound signal reproducing unit 90 while it is fluctuating is put onto the guide sprocket 91 to which rotation load is applied by a brake force produced across the stator 34 and the rotor 35, whereby that image film 1 is traveled onto the sound drum 13 under the state where fluctuating phenomenon is eliminated.

Since the image film 1 is traveled with perforations 3A, 3B being engaged with feed pawls of the guide sprocket 91, there is no possibility that fluctuation (change) of traveling state by fluctuation phenomenon is exerted as far as the putting (connecting) portion of the sound drum 13, etc. disposed at the position of the succeeding stage of the image film traveling path. Thus, the optical reading unit 20 provided in association with the sound drum 13 carries out reading and reproduction, in a stable state, of digital sound signals recorded in digital sound signal recording sections 5A, 5B.

In the digital sound signal reproducing apparatus (unit) of this embodiment, guide sprocket 91 is disposed in place of the first guide roller at the image film supply port 90A, thereby making it possible to reduce members such as guide sprocket, and tension roller, etc.

Figure 12:
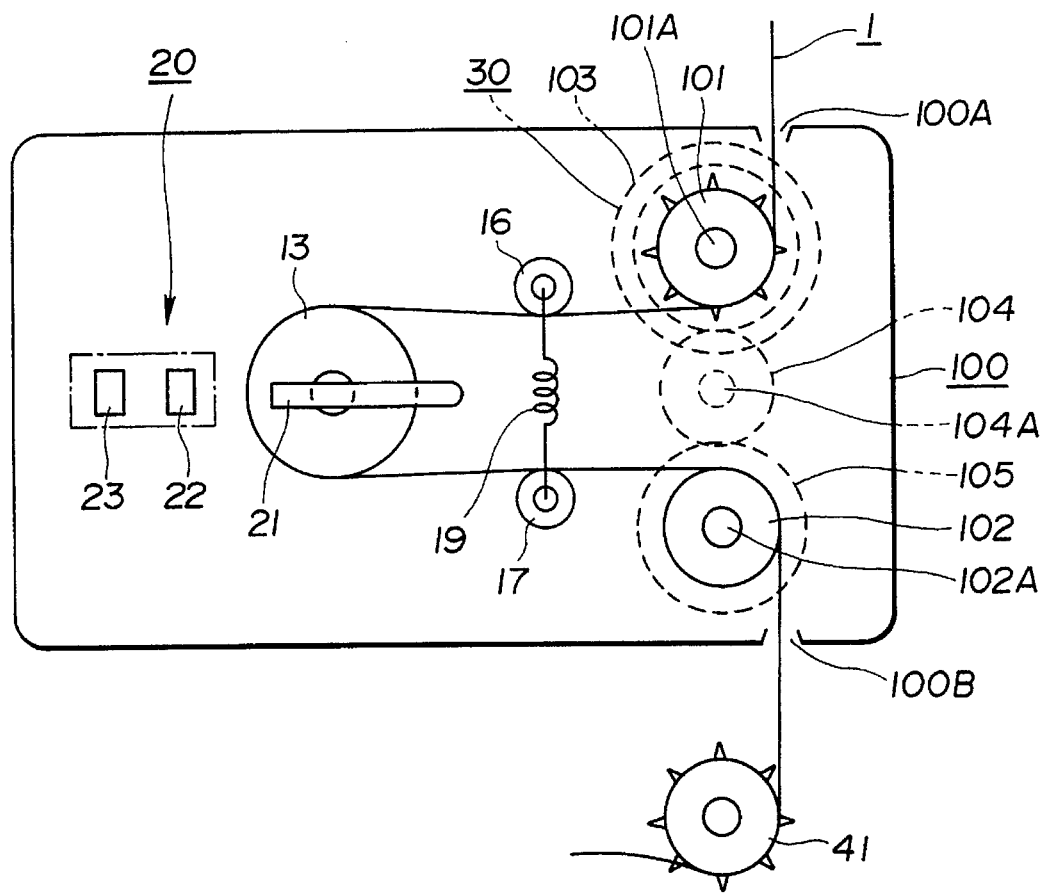
FIG. 12 is a view for explaining outline of the configuration of the entirety of a fourth embodiment of a digital sound signal reproducing apparatus for projector according to this invention.

A fourth embodiment digital sound signal reproducing apparatus (unit) 100 of this invention shown in FIG. 12 is directed to an apparatus in which, similarly to the above-described third embodiment digital sound signal reproducing apparatus 90, image film traveling adjustment unit 30 is provided in association with guide sprocket 101 disposed at image film supply port 100A, and a guide roller 102 disposed at an image film sending port 100B is rotationally driven in synchronism with the guide sprocket 101. Image film 1 delivered from supply section 51A of image film automatic supply/winding unit 50 is delivered from an image film supply port 100A into the digital sound signal reproducing unit 100.

The image film traveling adjustment unit 30 provided in association with the guide sprocket 101 disposed at the image film supply port 100A allows the image film 1 delivered in a fluctuated state to be traveled into the digital sound signal reproducing unit 100 so that it is in a stable state to deliver it from the image film sending port 100B to the digital projecting unit 40.

The guide sprocket 101 is such that a supporting shaft 101A is extended in a manner penetrated through the unit side plate, and rotor 35 of image film traveling adjustment unit 30 is fixed at the end portion thereof. Moreover, at the supporting shaft 101A of the guide sprocket 101, a toothed wheel 103 constituting the drive side is fixedly provided. On the other hand, also at the guide roller 102 disposed at the image film sending port 100B, a toothed wheel 105 constituting the follower side is fixedly provided at the supporting shaft 102A. The toothed wheel 103 on the guide sprocket and the toothed wheel 105 on the guide roller 102 side are connected by means of an intermediate toothed wheels 104 respectively meshing therewith. A supporting shaft 104A of the intermediate toothed wheel is supported on the unit side plate.

To the digital sound signal reproducing unit 100 constituted as described above, image film 1 fed out from image film automatic supply/winding unit 50 is delivered while it is fluctuating. The image film 1 is put on the guide sprocket 101 to which rotation load is applied by a brake force between stator 34 and rotor 35 of the image film traveling adjustment unit whereby it is traveled onto the sound drum 13 in the state where fluctuation phenomenon has been eliminated.

Since the image film 1 is traveled with perforations 3A, 3B being engaged with feed pawls of the guide sprocket 101, there is no possibility that fluctuation (change) of traveling state by fluctuation phenomenon is exerted on as far as the putting (connecting) portion of sound drum 13, etc. disposed at the position of the succeeding stage of the image film traveling path. Moreover, guide roller 102 disposed at the image film sending port 100B and adapted for delivering image film 1 to digital projecting unit 40 is rotationally operated in synchronism with guide sprocket 101 through a transmission system of the toothed wheel 103, the intermediate toothed wheel 104 and the toothed wheel 105 described above, thereby making it possible to travel the image film 1 in more stable state within the digital sound signal reproducing unit 100.

Thus, the optical reading unit 20 provided in association with the sound drum 13 carries out, in a stable state, reading and reproduction of digital sound signals recorded in digital sound signal recording sections 5A, 5B.

This invention may be also attained, except for the apparatus provided with image film traveling adjustment unit 30 adapted for traveling image film 1 in a stable state by electromagnetic brake force, by disposing, in the image film traveling path, a traveling load mechanism 111 constituted by a pair of load guide rollers 112, 114 for applying an extremely small traveling load to the image film 1. A fifth embodiment digital sound signal reproducing apparatus (unit) 110 is of a structure in which load guide rollers 112, 114 are disposed in a manner positioned at an image film supply port 110A.

Figure 13:
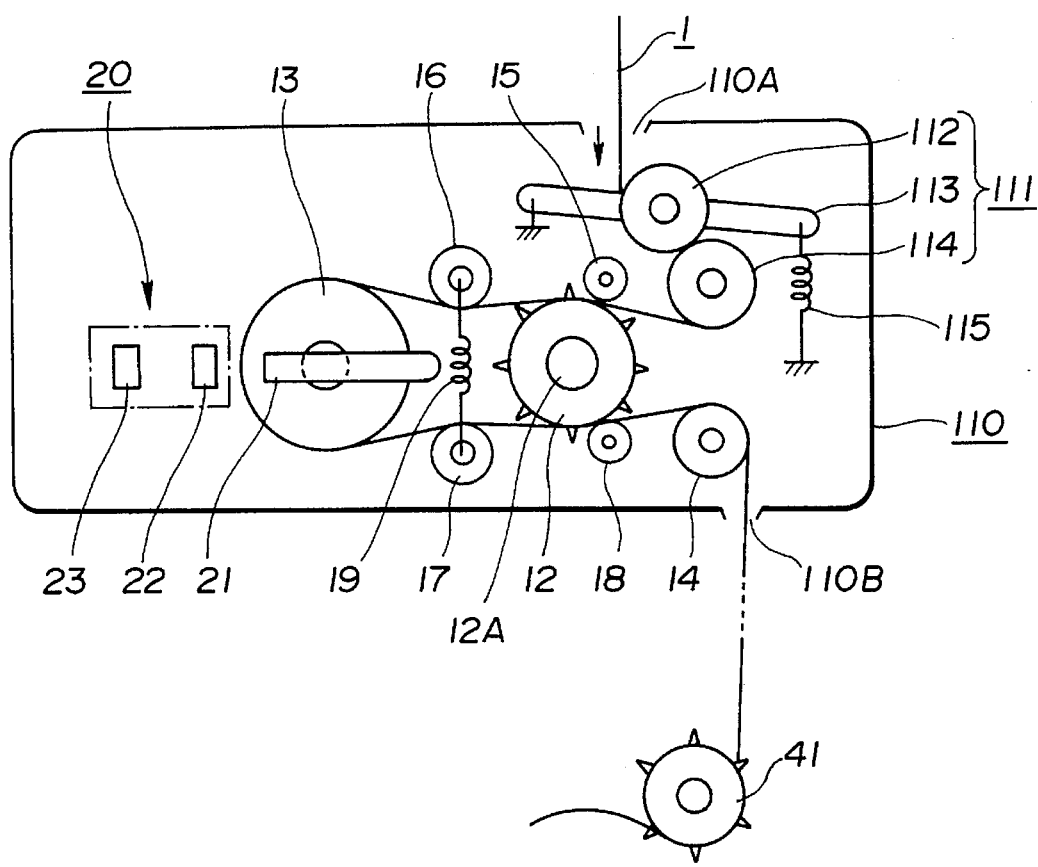
FIG. 13 is a view for explaining outline of the configuration of the entirety of a fifth embodiment of a digital sound signal reproducing apparatus for projector according to this invention.

The first load roller 112 is rotatably supported substantially at the central portion of an arm lever 113 one end portion of which is cantilever-supported at the unit side plate. The arm bar 113 is biased in clockwise direction in FIG. 13 as the result of the fact that a tension spring 115 having light elastic force is stretched at the free end side. The second load roller 114 is rotatably supported by a supporting shaft provided at the unit side plate in such a manner that the first load roller 112 and the outer circumferential surface are in contact with each other. Accordingly, the first load roller 112 and the second load roller 114 are constituted so that they rotate while allowing the outer circumferential surfaces to be elastically in contact with each other by elastic force of the tension spring 115.

It is to be noted that the configuration adapted for supporting first load roller 112 at arm bar 54 and allowing it to be elastically in contact with second load roller 114 by elastic force of tension spring 115 is the structure in which facility of cleaning work of these first and second load rollers 112 and 114 which will be described later is taken into consideration. Accordingly, the image film 1 is not caused to undergo traveling load in the state where it is put between first and second load rollers 112 and 114 by elastic force of tension spring 113.

The digital sound signal reproducing unit 110 turns back the image film 1 in a horizontal direction under the state where traveling load is applied, from the first and second load rollers 112 and 114 constituted as described later, to the image film 1 delivered from image film automatic supply/winding unit 50 thereafter to travel the image film 1 along the image film traveling path of guide sprocket 12, sound drum 13, guide sprocket 12 and guide roller 14 to deliver it from image film sending port 110B to digital projecting unit 40.

In the image film traveling path, first and fourth tension rollers 15 and 18 are disposed at the outer circumferential portion of the guide sprocket 12, and second and third tension rollers 16 and 18 which are elastically and attractively connected by an extension (tension) spring 19 are disposed between the guide sprocket 12 and the sound drum 13. Moreover, optical fiber 21, constituting the optical reading unit 20, objective (object, lens) section 22 and CCD line sensor 23 are respectively disposed at the sound drum 13.

Figure 14:
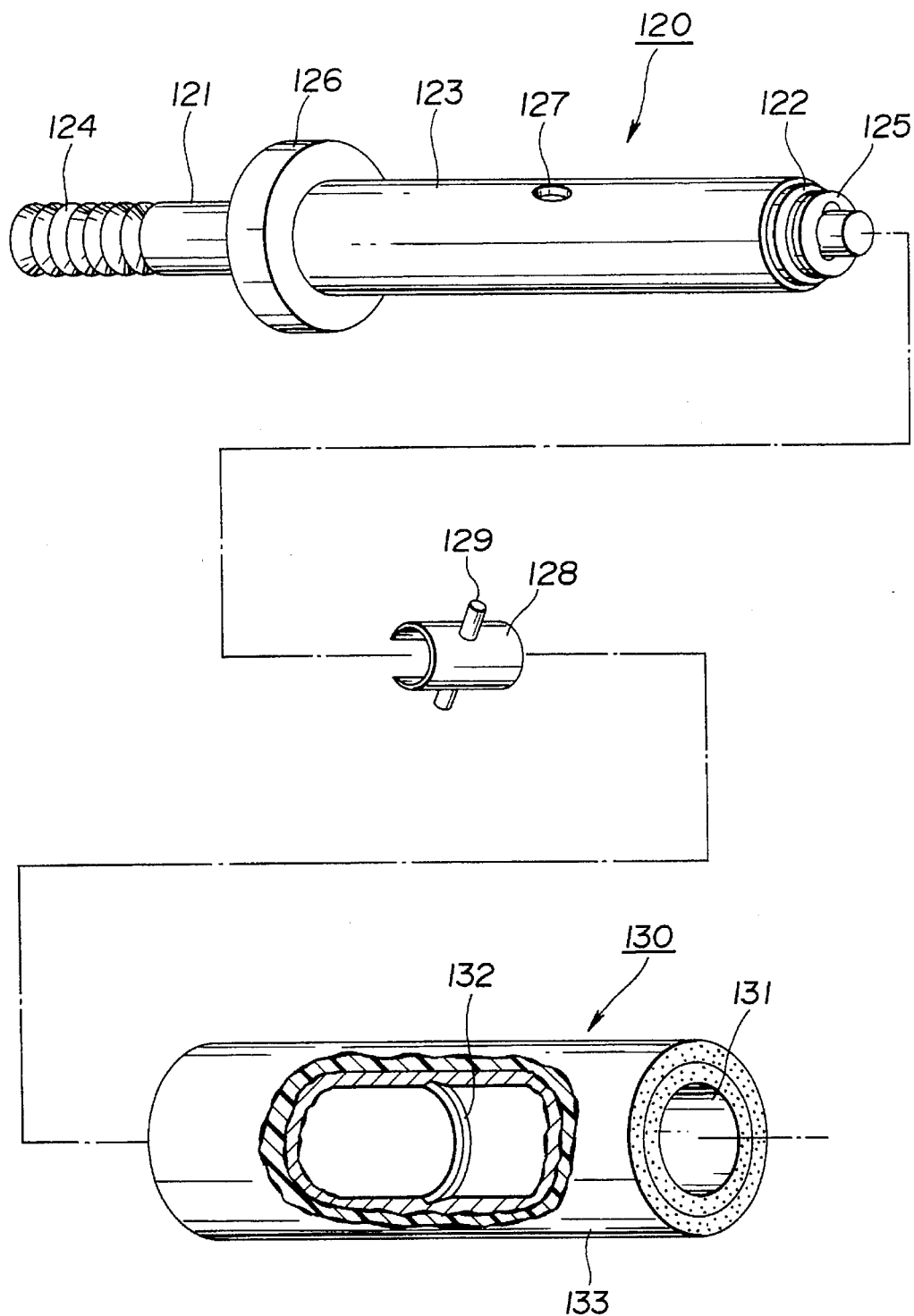
FIG. 14 is an exploded perspective view for explaining the configuration of an image film traveling load unit provided in the digital sound signal reproducing apparatus for projector.
Figure 15:
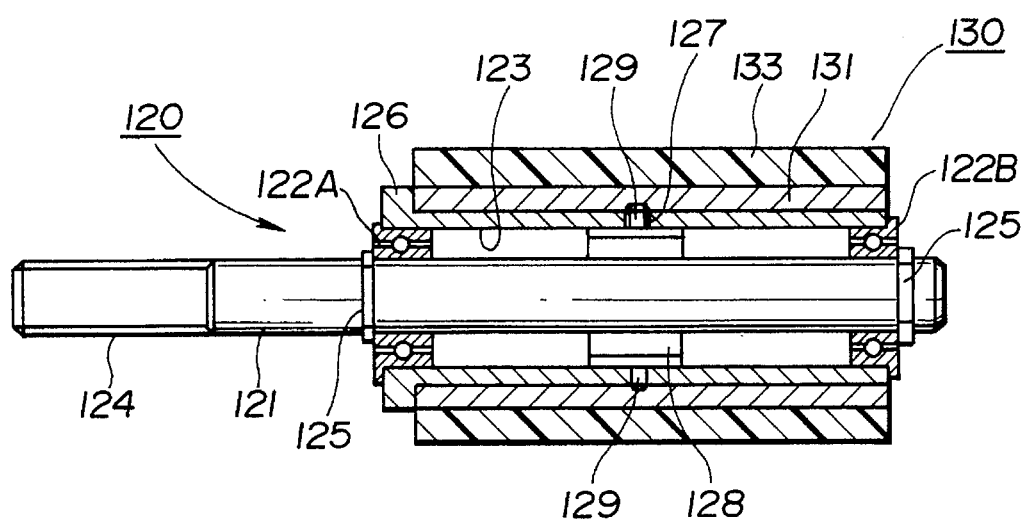
FIG. 15 is a longitudinal cross sectional view of the image film traveling load unit.

The first and second load rollers 112 and 114 constituting the traveling load mechanism 111 are comprised, as shown in FIGS. 14 and 15, of a supporting shaft portion 120, and a guide roller portion 130 rotatably axially fitted on the supporting shaft portion 120. The supporting shaft portion 120 is composed of a supporting shaft 121 made up (prepared) by shaving metallic circular rod, and a sleeve 123 rotatably assembled on the supporting shaft 121 by a pair of bearing members 122A, 122B. The supporting shaft 121 is cantilever-supported by an arm bar 113 through an attachment screw portion 124 provided on one end side, and bearing member 122 is assembled in the state fixed in the axial direction by a snap ring 125 in a manner spaced in the axial direction on the supporting shaft 121. In the sleeve a flange portion 128 for holding roller portion 130 which will be described later is integrally formed at one end portion thereof, and a through-hole 127 is bored at the outer circumferential surface thereof.

Between the supporting shaft 121 and the sleeve 123, a gap (clearance) portion is constituted (formed) by inserting the bearing member 122 into the portion therebetween, and a roller holding member 128 is assembled at the gap portion. The roller holding member 128 is a member in which a metallic plate spring member is formed by allowing the diameter of a metallic plate spring member to be slightly greater than the outer (outside) diameter of the supporting shaft 121 and curving it so as to take substantially C form, and a holding pin 129 is assembled in a manner to project toward the outer circumferential portion. The roller holding member 128 is assembled at the supporting shaft 121 in such a manner that the front end of the holding pin 129 is projected and exposed from a penetration hole 127 bored at the sleeve 123.

The roller portion 130 is composed of a roller supporting member 131 formed by aluminum alloy material, and a roller member 133 fitted over the outer circumferential portion of the roller supporting member 131. The roller supporting portion 131 is formed tubular so that its inner (inside) diameter is substantially equal to the outer diameter of the sleeve 123, and an engagement groove 132 with which the holding pin 129 projected and exposed from the penetration hole 127 of the sleeve 123 is concaved.

The roller member 133 is constituted by molding a roll shaped base by synthetic resin material having elasticity, e.g., polyurethane resin, and coating or infiltrating water proof material having weak adhesive property, e.g., silicon resin, etc. on the outer circumferential portion thereof so that a weak adhesive layer is formed on the outer circumferential portion. This roller member 133 is firmly fitted over the outer circumferential portion of the roller supporting member 131 by allowing the inner hole thereof to be slightly smaller than the outer diameter of the roller supporting member 131.

The roller supporting member 131 adapted so that the above-described roller member 133 is fitted over the outer circumferential portion is fitted over the outer circumferential portion of the sleeve 123. As the result of the fact that the roller supporting member 131 is thrust (forced) into the sleeve 123 along the axial direction thereof, the opening edge thereof is relatively engaged with the holding pin 129 which has been projected and exposed to the surface of the sleeve 123. When the roller supporting member 131 is further intensely thrust (forced) thereinto, it elastically deforms the roller holding member 128 in the center direction thus to withdraw the holding pin 129 toward the inner direction of the sleeve 123. Then, when the engagement groove 132 is thrust (forced) along the axial direction of the sleeve 123 up to the position corresponding to the penetration hole 127, the roller holding member 128 is elastically returned to allow the holding pin 129 to be projected and exposed from the penetration hole 127 toward the outer direction of the sleeve 123 to allow it to be relatively engaged with the engagement groove 132, whereby the roller supporting member 131 is axially affixed (mounted) on the sleeve 123.

The image film 1 delivered from the image film automatic supply/winding unit 50 is traveled under the state where it is stuck on the weak adhesive layer formed at the outer circumferential portion of the first and second load guide rollers 112 and 114. In these load guide rollers 112, 114, the weak adhesive layer of the outer circumferential portion thereof applies traveling load to the image film 1 traveling along the image film traveling path. Accordingly, the image film 1 travels, in a stable state, along the image film traveling path within the digital sound signal reproducing unit 110. In the process where the image film 1 is turned back on the outer circumferential portion of the sound drum 13, digital sound signals recorded in the digital signal recording sections 5A, 5B are precisely read out and reproduced by the optical reading unit 20 provided in association with the sound drum 13.

The digital sound signal reproducing apparatus (unit) 110 of this embodiment is adapted so that when the image film 1 travels in the state where it is put between the first and second load guide rollers 112 and 114, the apparatus serves to allow rubbish or dust, etc. attached (stuck) on the surface of the image film 1 to be stuck by the weak adhesive layer formed on the outer circumferential portion thereof to remove it. While load guide rollers 112, 114 performs a function to carry out cleaning rubbish or dust, etc. attached on the surface of the image film 1, in the case where the surface is severely stained, the roller portion 130 is detached from the supporting shaft portion 120 and cleaning is carried out.

Namely, the arm bar 113 supporting the first load guide roller 112 is adapted so that when the tension spring 115 connected thereto is removed or the arm bar is rotated against the elastic force of the tension spring 15, the arm bar allows the first and second load guide rollers 112 and 114 to be brought into a free state. Thereafter, with respect to respective rollers of these first and second load guide rollers 112 and 114, roller supporting portion 131 of roller portion is intensively pulled (drawn) along the sleeve 123 of the supporting portion 120.

Thus, the roller holding member 128 is elastically deformed in the center direction so that the holding pin 129 is withdrawn toward the inner direction, so the engagement state between the holding pin 129 and the engagement groove 132 is released, whereby the roller supporting member 131 is drawn out from the sleeve 23. With respect to the roller member 133 of the roller portion 130 drawn out in this way, e.g., adhesive tape having a greater adhesive force is caused to be in contact with the surface thereof, or washing of the roller member 133 is carried out, whereby cleaning is carried out so that rubbish or dust attached thereon is removed. In this case, the roller portion 130 which has been caused. to undergo cleaning is mounted (fitted) on the supporting shaft portion.

It is to be noted that, with respect to the above-described load guide rollers 112, 114, since the roller portions 130 are respectively molded by elastically deformable synthetic resin material, it is possible to carry out cleaning work while elastically deforming these load guide rollers 112, 114. Accordingly, with respect to these load guide rollers 112, 114, in cleaning work, labor to remove the roller portion 130 from the supporting shaft portion 120 every time is omitted, and traveling load mechanism 111 may be constituted so that arm bar 113 and tension spring 115 are not provided.

In the fifth embodiment digital sound signal reproducing apparatus (unit) 110 thus constituted, while the traveling load mechanism 111 which renders (applies) traveling load to image film 1 traveling along the image film traveling path is constituted by first load guide roller 112, second load guide roller 114, arm bar 113 and tension spring 115, this invention is not limited to such traveling load mechanism 111, but may be developed in various manners.

Namely, e.g., the first guide roller portion is comprised of a pair of guide rollers molded by elastic material such as rubber, etc., and these guide rollers are elastically hold by tension springs. Of course, the tension spring is assumed to have an elastic force sufficient to hold image film 1 between the guide rollers to apply traveling load to the image film 1 within a range where drive sprocket 41 of digital projecting unit constituting a drawing drive source for the image film 1 to the digital sound signal reproducing unit can be smoothly rotationally driven at a constant velocity.

In addition, at least one load guide roller in which weak adhesive layer is formed on the outer circumferential portion is disposed in a manner positioned at the supply side where sound drum 13 of the image film traveling path is disposed, thereby permitting the image film 1 to travel in a stable state, and such load guide rollers may be suitably disposed at portions except for the first guide roller portion.

What is claimed is:

1. A digital sound signal reproducing apparatus for a projector comprising:

a sound drum constituting a portion of an image film traveling path along with traveling guide means, and adapted so that an image film delivered from an image film supply unit travels circumferentially around said sound drum;

digital sound signal reading means provided in association with the sound drum, and adapted for reading and reproducing a digital sound signal recorded on a digital sound signal recording portion of the image film; and an image film traveling adjustment unit including traveling load means disposed in a manner at least positioned at a preceding stage of the image film traveling path with respect to the sound drum, and adapted for applying traveling load to the image film delivered to the digital sound signal reading means thus to stabilize traveling state; wherein the traveling load means of the image film traveling adjustment unit comprises electromagnetic brake means provided in association with the traveling guide means constituting the image film traveling path.

2. A digital sound signal reproducing apparatus as set forth in claim 1, wherein the traveling guide means in which the traveling load means is provided is traveling guide sprocket disposed in the state the sprocket and the sound drum are in parallel to each other, and adapted so that engagement portions are respectively engaged with perforations at the input side portion to the sound drum of the image film and the output side portion from the sound drum thereof to guide traveling of the image film.

3. A digital sound signal reproducing apparatus for a projector comprising:

a sound drum constituting a portion of an image film traveling path along with traveling guide means, and adapted so that an image film delivered from an image film supply unit travels circumferentially around said sound drum;

digital sound signal reading means provided in association with the sound drum, and adapted for reading and reproducing a digital sound signal recorded on a digital sound signal recording portion of the image film; and an image film traveling adjustment unit including traveling load means disposed in a manner at least positioned at a preceding stage of the image film traveling path with respect to the sound drum, and adapted for applying traveling load to the image film delivered to the digital sound signal reading means thus to stabilize traveling state, a guide roller which is one of plural guide rollers constituting the image film traveling path and rotatably supported by a supporting lever biased toward one side by elastic means; rotational position detecting means for the supporting lever, provided at the supporting shaft of the supporting lever; and a control section for comparing a displacement position of the supporting lever detected by the rotational position detecting means and a standard position to send a control output of a difference between the both positions thus to control the traveling load means.

4. A digital sound signal reproducing apparatus for a projector comprising:

a sound drum constituting a portion of an image film traveling path along with traveling guide means, and adapted so that an image film delivered from an image film supply unit travels circumferentially around said sound drum;

digital sound signal reading means provided in association with the sound drum, and adapted for reading and reproducing a digital sound signal recorded on a digital sound signal recording portion of the image film; and an image film traveling adjustment unit including traveling load means disposed in a manner at least positioned at a preceding stage of the image film traveling path with respect to the sound drum, and adapted for applying traveling load to the image film delivered to the digital sound signal reading means thus to stabilize traveling state; wherein the traveling load means comprises at least one traveling guide roller in which the outer circumferential portion on which the image film travels is comprised of a weak adhesive layer.

* * * * *